INVENTORS
P. J. KINNEY
L. C. KAHRE

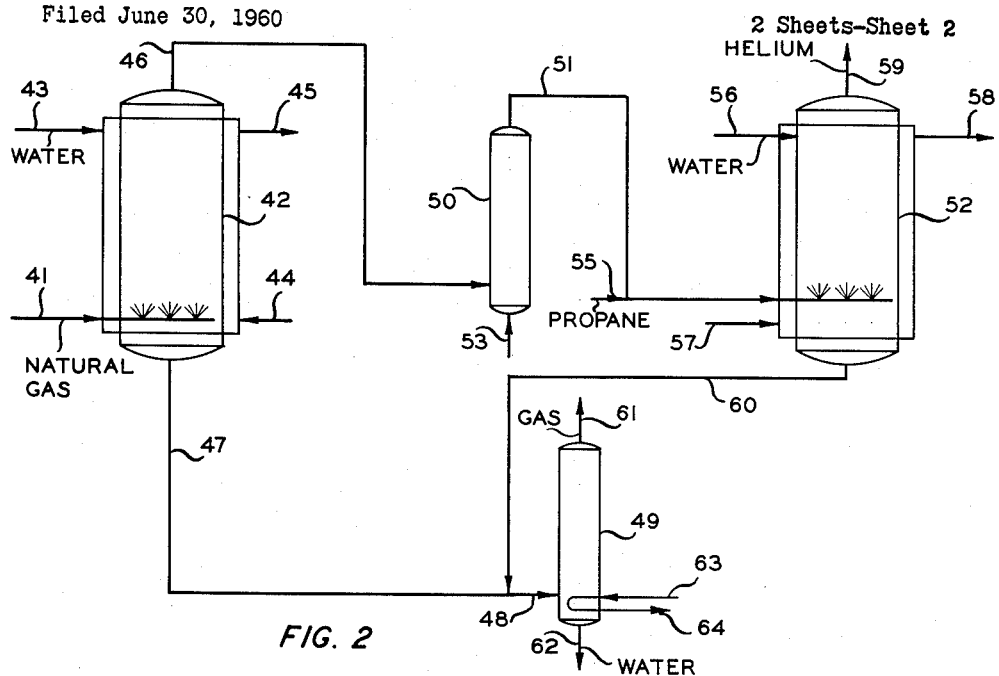
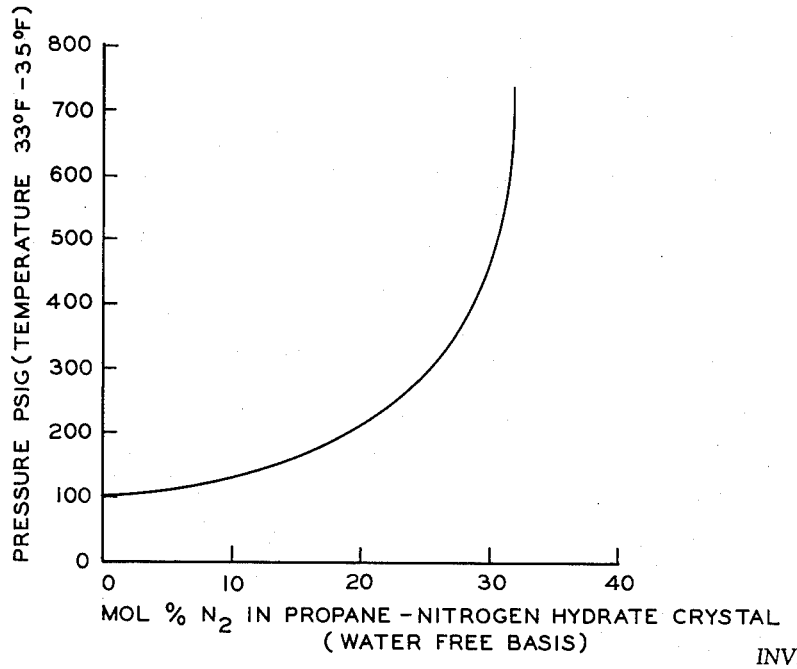

3,097,924
HELIUM RECOVERY FROM NATURAL GAS

Patrick J. Kinney, Ames, Iowa, and Leroy C. Kahre, Bartlesville, Okla., assignors to Phillips Petroleum Company, a corporation of Delaware
Filed June 30, 1960, Ser. No. 40,020
13 Claims. (Cl. 23—209)

This invention relates to an improved method for the recovery of helium from natural gas.

The use of natural gas as a source of commercial helium has met with difficulty in the prior art. The principal difficulty has been the presence of nitrogen which has made the commercial extraction of helium costly. The concentration of nitrogen in natural gas approximates or may greatly exceed the concentration of helium. Conventional separation methods have succeeded in producing a helium and nitrogen mixture, but normal separation methods have been found to be economically inadequate to effect a separation of helium from a helium-nitrogen mixture.

We have discovered that nitrogen will combine with a hydrate former such as propane and water to form nitrogen-propane hydrate crystals thus presenting an efficient economical method of separating helium from a helium-nitrogen mixture. We have further discovered that nitrogen alone will combine with water to form hydrate crystals.

It is an object of this invention to provide an improved method of recovering helium from natural gas.

It is another object of this invention to provide an improved method of separating helium from a helium-nitrogen mixture.

Other objects, advantages and features of my invention will become apparent to those skilled in the art.

In practicing the process of this invention, natural gas containing helium is contacted with water at a reduced temperature and at an elevated pressure so that hydrate crystals are formed with all components excepting helium, hydrogen and $C_5+$ hydrocarbons. Hydrogen and $C_5+$ hydrocarbons, if present, are separated from the helium by an oxidation step. Nitrogen, not removed in the initial hydration stage, is separated from the crude helium by contacting the impure helium with water and a hydrate former such as propane to form nitrogen-propane hydrate crystals at a reduced temperature and an elevated pressure. It is within the scope of this invention to employ other hydrate formers having a higher boiling point than nitrogen. The resultant mixture then forms hydrates, to include nitrogen, at a lower pressure than required to form the nitrogen hydrate crystal alone. Other suitable hydrate formers are methane, ethane, isobutane, carbon dioxide, hydrogen sulfide, Freon-12, and sulfur dioxide.

FIGURE 2 is a schematic diagram of an alternative inventive process.

FIGURE 3 is a diagram of the concentration of nitrogen in a nitrogen-propane hydrate crystal.

Figure 1:
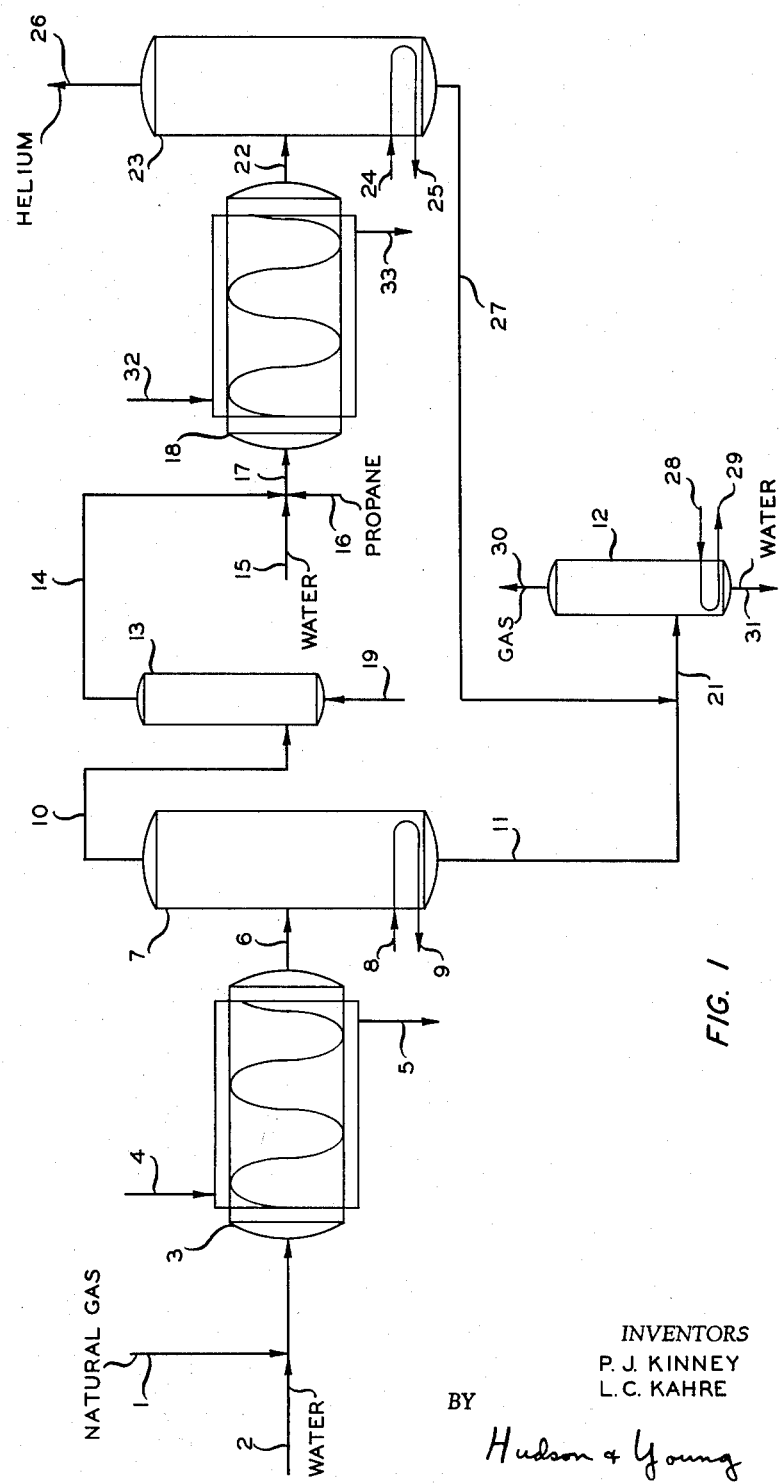
FIGURE 1 is a schematic diagram of one embodiment of the inventive process.

Referring to FIGURE 1, the inventive process will be described as it applies to the recovery of helium from natural gas. Natural gas containing approximately 0.8 mol percent of helium is passed through a conduit 1 to a conduit 2 where it is mixed with water and the resulting mixture passed to a jacketed contact vessel 3 equipped with a rotary scraper. As shown in the diagram the water and natural gas streams may be mixed prior to entering the contact vessel 3 or they may be admitted separately into the vessel 3. It is within the scope of this invention to provide other means of mixing, not herein described, to effect the intimate contact between the water and the natural gas stream within the contact vessel 3. The ratio of water to natural gas on a pound basis should be in the range of 20:1 to 100:1, preferably 50:1. The temperature and pressure of the contact vessel 3 is maintained in the range of 32 to 75° F. and 100 to 25,000 p.s.i.g. respectively, preferably 33 to 40° F. and 500 to 5,000 p.s.i.g. Operating the contact vessel 3 at a pressure in the lower region of the specified pressure range will necessitate maintaining the temperature of the vessel 3 at or near 32° F. The temperature within the jacketed vessel 3 is maintained by a cooling medium introduced through a conduit 4 and removed through a conduit 5. Contact in the vessel 3 between the natural gas and the water should be maintained for a period of time in the range of 5 to 60 minutes. It is to be understood that the contact time will be dependent upon the degree of contact and the heat transfer rate.

Hydrate crystals are formed within the vessel 3 containing all the components of the natural gas feed stream with the exception of helium, hydrogen and $C_5+$ hydrocarbons. The hydrate crystals so formed will contain the nitrogen present in the natural gas feed to an extent dependent upon the pressure employed in contactor 3; the higher the pressure, the more nitrogen is hydrated and removed. A pressure in the 5,000 to 25,000 range would remove all nitrogen. In operating at lower pressures the remaining nitrogen is removed by a subsequent procedural step.

The resulting slurry containing approximately 10 percent by weight of hydrate crystals is passed through a conduit 6 to a phase separator 7. The inlet conduit 6 is positioned so that the slurry will be introduced into the separator 7 above the water-hydrate crystal phase. The temperature of the separator 7 is maintained in the range of 32 to 75° F. by heat exchange means positioned adjacent to the bottom of the separator 7. A cooling medium is introduced to the heat exchange means through a conduit 8 and removed through a conduit 9. The slurry feed stream is permitted to separate into two phases within the separator 7. A gaseous stream containing helium and nitrogen is withdrawn from the phase separator 7 by means of an outlet conduit 10. If the natural gas feed stream to the contact vessel 3 contains hydrogen and $C_5+$ hydrocarbons, these components will also be present in the gaseous stream. Water and hydrate crystals containing the remaining constituents of the natural gas feed stream are withdrawn from the bottom of the phase separator 7 and passed by means of conduits 11 and 21 to a heated vessel 12.

Although not shown in FIGURE 1, it is within the scope of this invention to expand the hydrate slurry from separator 7 to a low pressure and pass said expanded slurry through all or a portion of the jacket of contactor 3. Nearly all the refrigeration required in contactor 3 can thus be recovered from the hydrate crystal slurry.

The hydrogen and $C_5+$ hydrocarbon components are removed from the gaseous stream by passing said stream over an oxidation catalyst bed in a vessel 13. Suitable oxidation catalysts that may be utilized are cupric oxide, and the metal naphthenates such as lead naphthenate and manganese naphthenate. A gaseous stream containing helium and nitrogen is removed from the top of the vessel 13 and passed by means of conduits 14 and 17 to a contact vessel 18 equipped with a rotary scraper. Hydrogen is oxidized to water and the hydrocarbons are converted to carbon dioxide and water in vessel 13. These components are subsequently removed as hydrates in the second hydrate forming step. The catalyst is regenerated by passing oxygen through the bed by means of a conduit 19.

The gaseous stream from the oxidation vessel 13 is mixed with water and a hydrate former such as propane and admitted through conduits 15 and 16, respectively. As disclosed previously, this mixing may be conducted prior to the entry of the streams into a contact vessel 18 as shown, or mixing may be effected after the streams are independently introduced into the vessel 18. It is within the scope of this invention to provide mechanical means of mixing, not herein described, to effect intimate contact of the three streams within the contact vessel 18. The streams are mixed in the ratio of 5 to 14 parts of propane per part of nitrogen and 25 to 125 parts of water per part of propane on a pound basis, preferably 5 parts propane and 350 parts of water per part of nitrogen. The temperature and pressure of the jacketed contact vessel 18 are maintained within a range of 32 to 75° F. and 100 to 25,000 p.s.i.g. respectively, preferably within a range of 33 to 40° F. and 500 to 5,000 p.s.i.g. by a cooling medium introduced through a conduit 32 and withdrawn through a conduit 33. Residence time within the vessel 18 is in the range of 5 to 60 minutes, the exact time dependent upon the degree of contact and the heat transfer rate.

The resulting slurry containing approximately 10 percent by weight of nitrogen-propane hydrate crystals is passed by means of a conduit 22 to a phase separator 23. The inlet conduit 22 is so positioned that the slurry is introduced into the separator 23 above the water and hydrate crystal phase. The temperature of the separator 23 is maintained in the range of 32 to 75° F. by a heat exchange means positioned adjacent to the bottom of the separator 23 so that the hydrate crystals formed in the contact vessel 18 will not decompose while being separated from the gaseous phase. A cooling medium is passed to the heat exchange means through a conduit 24 and removed by conduit 25.

Helium is withdrawn from the top of the phase separator 23 by means of a conduit 26. Nitrogen-propane hydrate crystals and water are withdrawn from the bottom of the phase separator 23 and passed by means of conduits 27 and 21 to a heated vessel 12. The nitrogen-propane hydrate crystals from the phase separator 23 may also be expanded and used to cool contactor 18 as described for contactor 3.

If the hydrate crystals are not melted in heat exchange with the feed, they are decomposed in a heated vessel 12 and the resulting gases withdrawn by means of a conduit 30 for further processing. Water is withdrawn from the bottom of the heated vessel 12 by means of a conduit 31 and may be recycled to contact vessels 3 and 18. A heat exchange means is positioned adjacent to the bottom of the heated vessel 12 and heat is supplied to said heat exchange means by a conduit 28 and removed by a conduit 29.

Referring to FIGURE 2, an alternative process will be described as it applies to the recovery of helium from natural gas. Natural gas containing approximately 0.8 mol percent of helium is passed through a conduit 41 and dispersed in the water phase of a contact vessel 42. Water is introduced to the contact vessel 42 by means of a conduit 43 at a rate sufficient to maintain a water to gas feed ratio on a pound basis in the range of 100:1 to 20:1, preferably 50:1, within the vessel 42. A water level is maintained within the vessel 42 sufficient to permit a contact residence time for the gas and water in the range of 5 to 60 minutes. It is within the scope of this invention to provide additional mechanical mixing equipment if required.

The temperature of the contact vessel 42 is maintained within the range of 32 to 75° F., preferably within a range of 33 to 40° F., by jacketing the vessel and passing a cooling medium through a conduit 44 to the jacket and removing the cooling medium by a conduit 45. The pressure of the contact vessel 42 is maintained within the range of 100 to 25,000 p.s.i.g., preferably within the range of 500 to 5,000 p.s.i.g.

A gaseous stream containing helium and nitrogen is withdrawn from the top of the contact vessel 42 by means of a conduit 46. If the raw natural gas feed to the contact vessel 42 contains $C_5+$ hydrocarbons and hydrogen, these components will also be present in the gaseous stream withdrawn from the contact vessel 42. Water and hydrate crystals containing the remaining constituents of the natural gas feed stream are withdrawn from the bottom of the contact vessel 42 by means of an outlet conduit 47 and passed to a heated vessel 49 by means of conduits 47 and 48. The crystals can be expanded and used to cool contactor 42, as previously disclosed.

The hydrogen and $C_5+$ hydrocarbon components are removed from the gaseous stream by passing said stream through an oxidation catalyst bed in a vessel 50 and forming hydrate crystals with the oxidation products in the second hydration step as previously described. A gaseous stream containing helium and nitrogen is removed from the top of the vessel 50 and passed by means of a conduit 51 to a contact vessel 52. The oxidation catalyst bed in vessel 50 is regenerated by passing oxygen through the bed by means of conduit 53.

The gaseous stream from the oxidation vessel 50 is mixed with propane admitted through conduit 55 and the mixture dispersed throughout the lower region of the water phase within the contact vessel 52. Propane can be introduced to the contact vessel 52 independently. Water is introduced into the contact vessel 52 by means of a conduit 56. The streams are charged to the contact vessel 52 in the ratio of 5 to 14 parts of propane per part of nitrogen and 25 to 125 parts of water per part of propane on a pound basis, preferably 5 parts propane and 350 parts of water per part of nitrogen. A water level is maintained within the vessel 52 sufficient to permit a contact residence time for the helium-nitrogen gas, propane and water in the range of 5 to 60 minutes. It is within the scope of this invention to provide additional mechanical mixing equipment if required.

The temperature of the contact vessel 52 is maintained within the range of 32 to 75° F., preferably within a range of 33 to 40° F., by jacketing the contact vessel 52 and passing a cooling medium to said jacket by means of a conduit 57 and removing said cooling medium by means of a conduit 58. Pressure of the contact vessel 52 is maintained within the range of 100 to 25,000 p.s.i.g., preferably within a range of 500 to 5,000 p.s.i.g.

Helium is withdrawn from the top of the contact vessel 52 by means of a conduit 59. Water and nitrogen-propane hydrate crystals are withdrawn from the bottom of the contact vessel 52 and passed by means of conduits 60 and 48 to a heated vessel 49, or to heat exchange with contactor 52.

The hydrate crystals are decomposed in the heated vessel 49 and the resulting gases withdrawn by means of a conduit 61 for further processing. Water is withdrawn from the bottom of the heated vessel 49 by means of a conduit 62 and may be recycled to contact vessels 42 and 52. A heat exchange means is positioned adjacent to the bottom of the heated vessel 49 and heat is supplied to said heat exchange means by means of a conduit 63 and withdrawn by means of a conduit 64.

Referring to FIGURE 3, variation in the concentration of nitrogen present in a nitrogen-propane hydrate crystal on a water-free basis is illustrated. To obtain the information illustrated by this curve the nitrogen-propane hydrate crystals were isolated, decomposed, and the resulting gases analyzed by chromatography. The evidence is conclusive that nitrogen and propane form hydrate crystals, providing an efficient process for the separation of helium from a helium-nitrogen mixture.

It is, of course, obvious that only a portion of the process equipment discussed is necessary to effectuate the separation of helium from a helium-nitrogen mixture substantially free of other components. In each of the described processes the initial hydration stage can be eliminated thus simplifying the process. As previously noted, the first stage of each process can be used to produce pure helium from natural gas by employing pressures in the range of 5,000 to 25,000 p.s.i. The second hydration stage of the disclosed processes can also be employed alone to effect the separation of helium from natural gas.

It has been discovered that a hydrate crystal slurry wherein the concentration of crystals is in the range of 10 percent by weight can be more easily transported and processed than a slurry containing a higher concentration of hydrate crystals. A large volume of water is, therefore, preferred but not necessarily required. It is within the scope of this invention to aid the formation of hydrate crystals by seeding the feed stream to the contact zones.

The following example is presented as illustrating the formation of nitrogen-propane hydrate crystals.

*Example*

Liquid propane was contacted with water under nitrogen pressure in a stirred Jerguson gauge. The resulting hydrate crystals were then decomposed and the nitrogen to propane ratio determined by analyzing the gaseous product by chromatography. The temperature of the bath containing the Jerguson gauge was maintained between 33 and 35° F. The results are graphically illustrated in FIGURE 3.

As will be evident to those skilled in the art, various modifications of this invention can be made, or followed, in the light of the foregoing disclosure and discussion, without departing from the spirit or scope thereof.

We claim:

1. The process of recovering helium from a helium-containing natural gas which comprises contacting said natural gas with water in a contact zone, maintaining the temperature and pressure of said contact zone in the range of 32 to 75° F. and in the range of 5,000 to 25,000 p.s.i.g., respectively, so as to form nitrogen hydrate crystals within said contact zone-withdrawing helium from said contact zone, and withdrawing said nitrogen hydrate crystals from said contact zone.

2. The process of claim 1 to include maintaining a ratio of water to natural gas feed within said contact zone in the range of 20:1 to 100:1 on a pound basis.

3. The process of recovering helium from a helium-containing natural gas which comprises passing said natural gas to a contact zone, introducing independently into said contact zone in addition to said natural gas feed a nitrogen hydrate former in an amount sufficient to form nitrogen hydrate crystals, said hydrate former selected from the group consisting of methane, ethane, propane, isobutane, carbon dioxide, hydrogen sulfide, Freon-12, and sulfur dioxide, passing water to said contact zone, maintaining the temperature and pressure of said contact zone in the range of 32 to 75° F. and in the range of 100 to 25,000 p.s.i.g., respectively, withdrawing helium from said contact zone, and withdrawing said nitrogen hydrate crystals from said contact zone.

4. The process of separating nitrogen from a helium-nitrogen mixture which comprises passing a helium-nitrogen feed to a contact zone, introducing independently into said contact zone in addition to said helium-nitrogen feed a nitrogen hydrate former in an amount sufficient to form nitrogen hydrate crystals, said nitrogen hydrate former selected from the group consisting of methane, ethane, propane, isobutane, carbon dioxide, hydrogen sulfide, Freon-12, and sulfur dioxide, passing water to said contact zone, maintaining the temperature and pressure of said contact zone in the range of 32 to 75° F. and in the range of 100 to 25,000 p.s.i.g., respectively, so as to form nitrogen hydrate crystals, withdrawing helium from said contact zone, and withdrawing said nitrogen hydrate crystals from said contact zone.

5. The process of claim 4 wherein the hydrate former is propane and the ratio of propane to nitrogen in the feed to the contact zone is in the range of 5:1 to 14:1 and the ratio of water to propane feed to said contact zone is in the range of 25:1 to 125:1 on a pound basis.

6. The process of claim 5 wherein the hydrate former is propane and the temperature of said contact zone is maintained in the range of 33 to 40° F. and the pressure of said contact zone is maintained in the range of 500 to 5,000 p.s.i.g.

7. The process of recovering helium from a helium-nitrogen mixture which comprises passing a helium-nitrogen feed to a contact zone, introducing independently into said contact zone in addition to said feed a nitrogen hydrate former in an amount sufficient to form nitrogen hydrate crystals, said nitrogen hydrate former selected from the group consisting of methane, ethane, propane, isobutane, carbon dioxide, hydrogen sulfide, Freon-12, and sulfur dioxide, passing water to said contact zone, maintaining the temperature and pressure of said contact zone in the range of 32 to 75° F. and in the range of 100 to 25,000 p.s.i.g., respectively, so as to form nitrogen hydrate crystals, passing the resulting slurry to a phase separation zone, permitting said slurry to separate into two separate phases within said phase separation zone, withdrawing helium from said phase separation zone, and withdrawing nitrogen hydrate crystals from said phase separation zone.

8. The process of recovering helium from a helium-containing natural gas which comprises contacting said natural gas with water in a first contact zone, maintaining the temperature of said contact zone in the range of 32 to 75° F. and the pressure of said first contact zone in the range of 100 to 25,000 p.s.i.g. so as to form hydrate crystals within said first contact zone, withdrawing a gaseous stream containing helium from said first contact zone, withdrawing water and hydrate crystals from said first contact zone, passing said gaseous stream to a second contact zone, introducing independently into said second contact zone in addition to said gaseous stream a nitrogen hydrate former in an amount sufficient to form nitrogen hydrate crystals, said hydrate former selected from the group consisting of methane, ethane, propane, isobutane, carbon dioxide, hydrogen sulfide, Freon-12, and sulfur dioxide, passing water to said second contact zone, maintaining the temperature of said second contact zone in the range of 32 to 75° F. and the pressure of said second contact zone in the range of 100 to 25,000 p.s.i.g., withdrawing water and nitrogen hydrate crystals from said second contact zone, and withdrawing helium from said second contact zone.

9. The process of claim 8 to include the process steps of passing said water and hydrate crystals withdrawn from said first and second contact zones to a heated zone, withdrawing a gaseous stream from said heated zone, and withdrawing water from said heated zone.

10. The process of claim 8 wherein the hydrate former is propane and the temperatures and pressures of the initial contact zone and the second contact zone are maintained in the range of 33 to 40° F. and 500 to 5,000 p.s.i.g., respectively.

11. The process of claim 10 wherein the water to natural gas feed ratio to the initial contact zone is in the range of 20:1 to 100:1, the propane to helium-nitrogen gas feed ratio to the second contact zone is in the range of 5:1 to 14:1, and the water to propane feed ratio to said second contact zone is in the range of 25:1 to 125:1, on a pound basis.

12. The process of recovering helium from a helium-containing natural gas which comprises contacting said natural gas with water in a first contact zone, maintaining the temperature of said first contact zone in the range of 32 to 75° F. and the pressure of said first contact zone in the range of 100 to 25,000 p.s.i.g. so as to form hydrate crystals within said first contact zone, withdrawing water and hydrate crystals from said first contact zone, passing a gaseous stream containing helium from said first contact zone to an oxidation zone, passing a $C_5+$ hydrocarbon-free and a hydrogen-free gaseous stream containing helium from said oxidation zone to a second contact zone, introducing independently into said second contact zone in addition to said gaseous stream a nitrogen hydrate former in an amount sufficient to form nitrogen hydrate crystals, said hydrate former selected from the group consisting of methane, ethane, propane, isobutane, carbon dioxide, hydrogen sulfide, Freon-12, and sulfur dioxide, maintaining the temperature of said second contact zone in the range of 32 to 75° F. and the pressure of said second contact zone in the range of 100 to 25,000 p.s.i.g., respectively, withdrawing water and nitrogen hydrate crystals from said second contact zone, and withdrawing helium from said second contact zone.

13. The process of recovering helium from a helium-containing natural gas which comprises contacting said natural gas with water in a first contact zone, maintaining the temperature of said first contact zone in the range of 32 to 75° F. and the pressure of said first contact zone in the range of 100 to 25,000 p.s.i.g. so as to form hydrate crystals within said first contact zone, passing the resulting slurry from said first contact zone to a first phase separation zone, permitting said slurry to separate into two separate phases within said first phase separation zone, withdrawing water and hydrate crystals from said first phase separation zone, passing a gaseous helium-containing stream from said first phase separation zone to an oxidation zone, pasisng a $C_5+$ hydrocarbon-free and hydrogen-free gaseous stream containing helium from said oxidation zone to a second contact zone, introducing independently into said second contact zone in addition to said gaseous stream a nitrogen hydrate former in an mount sufficient to form nitrogen hydrate crystals, said hydrate former selected from the group consisting of methane, ethane, propane, isobutane, carbon dioxide, hydrogen sulfide, Freon-12, and sulfur dioxide, passing water to said second contact zone, maintaining the temperature of said second contact zone in the range of 32 to 75° F. and the pressure of said second contact zone in the range of 100 to 25,000 p.s.i.g. so as to form nitrogen hydrate crystals, passing the resulting slurry from said second contact zone to a second phase separation zone, permitting the slurry within said second phase separation zone to separate into two separate phases, withdrawing water and nitrogen hydrate crystals from said second phase separation zone, withdrawing helium from said second phase separation zone, combining said water and hydrate crystals withdrawn from said first phase separation zone and said second phase separation zone, passing said combined water and hydrate crystals to a heated zone, withdrawing a gaseous stream from said heated zone, and withdrawing water from said heated zone.

References Cited in the file of this patent

UNITED STATES PATENTS

| | | |
|---|---|---|
| 2,363,529 | Hutchinson | May 6, 1941 |
| 2,375,559 | Hutchinson et al. | May 8, 1945 |
| 2,375,560 | Hutchinson et al. | May 8, 1945 |
| 2,399,723 | Crowther | May 7, 1946 |
| 2,448,719 | Latchum | Sept. 7, 1948 |
| 2,740,693 | Pomykala | Apr. 3, 1956 |